April 21, 1936.                    J. J. McCANN                    2,037,992
                              BALL BEARING JOINT
                             Filed June 23, 1934

WITNESSES:
Jackson F. Mormann
Anna M. Ward

INVENTOR:
John J. McCann
BY
Joshua R. H. Potts
ATTORNEY

Patented Apr. 21, 1936

2,037,992

UNITED STATES PATENT OFFICE 2,037,992

BALL BEARING JOINT

John J. McCann, Burlington, N. J.

Application June 23, 1934, Serial No. 732,073

4 Claims. (Cl. 287—101)

This invention relates to ball bearing joints, and has for an object to provide a joint wherein both the longitudinal and lateral stresses are applied directly to a single series of balls.

A further object of the invention is to provide a ball bearing joint especially adapted for the knee joint of an artificial leg, but having elements of general utility.

A further object of the invention is to provide a ball bearing joint having limited oscillating action, every stress of which is transmitted to the balls, and with improved means for holding the joint as a unitary structure.

The invention, therefore, comprises two coacting parts having interacting races which, together, form one-half of a complete ball race, and with a sleeve spanning the plane of juncture of said sections, having a groove therein coacting with the race grooves of the two sections to complete the ball race.

The drawing illustrates an embodiment of the invention and the views therein are as follows.

Like characters indicate corresponding parts throughout the several views.

Figure 2:
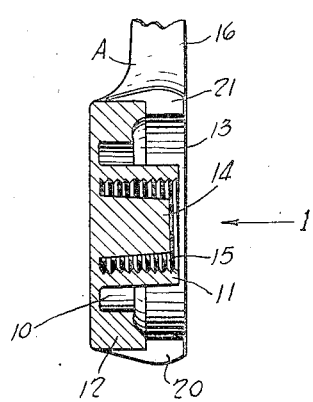
Figure 2 is a diametrical sectional view taken on line 2—2 of Figure 1.
Figure 1:
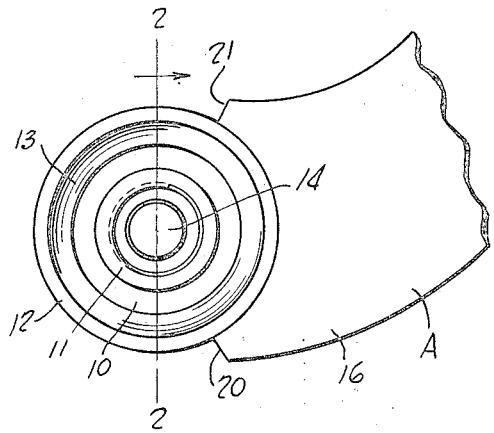
Figure 1 is a view in elevation of one section of the joint.
Figure 6:
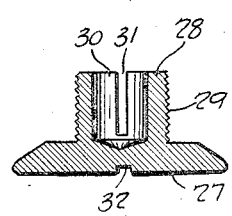
Figure 6 is a view in diametrical section of the screw employed for maintaining the several parts in unity.
Figure 5:
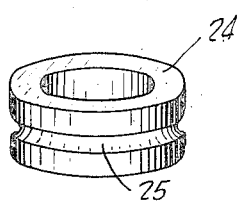
Figure 5 is a perspective view of the sleeve which coacts with other parts to complete the joint.
Figure 3:
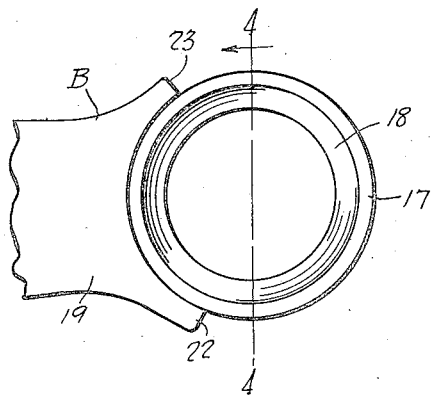
Figure 3 is a view in elevation of the other member of the joint.
Figure 4:
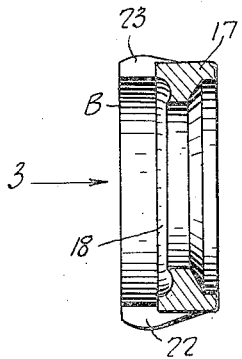
Figure 4 is a transverse sectional view taken on line 4—4 of Figure 3.

The improved ball bearing joint which forms the subject-matter of this application comprises two sections A and B. The section A is formed with an annular furrow 10, one wall of which is formed by the socket member 11, and one wall by the shoulder member 12 which in turn is provided with an arcuate groove 13 forming a part of the ball race in the manner to be hereinafter more fully described. Within the socket member 11, a stud 14 is provided, having a taper, as indicated, the smaller end of said stud being outermost.

The socket member 11 is internally screw-threaded, as shown at 15. To this structure, an arm 16 is connected, integrally or otherwise, which serves to attach the joint to the structure which is jointed, but the shape of the arm is unimportant to the present invention.

The part B comprises a shoulder member 17 having an arcuate groove 18 formed therein, which coacts with the arcuate groove 13 in forming a ball race, as will be hereinafter more fully described.

To this member is also attached an arm 19, and the two arms 16 and 19 are preferably provided with shoulders 20 and 21 on the section A, and shoulders 22 and 23 on the section B, which will limit the oscillating action of the two when associated.

As a further provision for the ball race, a sleeve 24 is properly proportioned to fit snugly the exterior of the socket member 11, and is provided about its exterior and preferably substantially equi-distant from the ends, with a groove 25.

When associated, the sleeve 24 is fitted upon the socket member 11 and the balls 26 introduced into that part of the ball race defined by the groove 25 of the sleeve and the groove 13 of the section A.

The section B is now applied so that the groove 19 of this section B will bear upon the balls 26 and all secured together by means of a screw member 27. The screw member is provided with a shank 28 which is screw-threaded, as at 29, and provided with a bore 30. It is also slitted, as at 31, with one or more slits as may be found desirable. The screw head is provided with a kerf 32 for assisting in placing and displacing.

Figure 7:
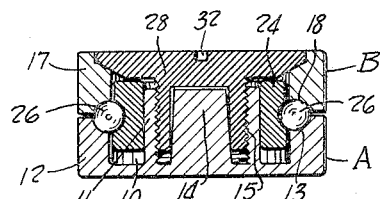
Figure 7 is a transverse sectional view through the completed joint, the plane of the section being as indicated by lines 2—2 and 4—4, but looking in the opposite directions.

To hold the several parts in a unitary structure, the screw is inserted as indicated at Figure 7, to engage the internal screw threads of the socket member 11, and by reason of the bore 30 and the taper of the stud 14, and accommodated by the slits 31, the screw shank will be expanded as it is forced home, so that when in proper position, it is securely locked and removable only by the exercise of very considerable force.

It will be seen from an examination of Figure 7 that any stress transmitted from the part A to the part B, or the reverse, will be taken by the balls 26, while any transverse stress, as for instance, any stress tending to move the two members A and B angularly will also be taken by the balls 26.

The device, therefore, comprises by reason of the three sections each provided with a part of a ball race, a joint which will adapt itself to take stresses in all directions to which such a joint is subject.

Of course, the ball bearing joint herein illustrated may be modified and changed in various ways without departing from the invention herein set forth and hereinafter claimed.

I claim:—

1. A ball bearing joint comprising sections adapted to oscillate relative to each other, each of said sections being provided with a part of a ball race, a floating member independent of said sections provided with another part of the ball race, all of said parts coacting to take thrust upon the balls incident upon a movement in any direction, and a member engaging both of said sections maintaining said organization.

2. A ball bearing joint comprising interacting sections having circular parts of like radius, each of said parts being provided with a ball race part equally spaced from the center, a socket member upstanding in one of said parts concentrically within the ball race parts, a sleeve mounted to float upon said socket part and provided with a ball race part positioned for coaction with the ball race parts of the sections, balls in said ball race in engagement with all of said ball race parts simultaneously, and means maintaining said structure as a unit.

3. A ball bearing joint comprising two sections each having circular parts of like radius and each provided with a concentric ball race part of like radius and positioned to coact when associated, a socket member upstanding centrally from one of said parts and having an internal screw thread, a sleeve fitting the outer surface of said socket member and provided with a ball race part positioned for coaction with the ball race parts of the two sections, balls located within the ball race and contacting simultaneously with all of the ball race parts, a stud within the socket member having a taper, and a screw having an external thread and an internal bore, the thread fitting the internal thread of the socket member and the bore fitting upon the tapered stud.

4. A ball bearing joint comprising two interacting sections each provided with ball race parts, a socket member carried by one of said sections externally cylindrical and internally cylindrical and threaded, a tapered stud concentrically within the socket member, and a screw member having a bore adapted to fit upon the stud and slitted for expansion by the stud, said screw member having threads fitting the internal threads of the socket member, and a head acting as an abutment for maintaining the two sections in unitary form.

JOHN J. McCANN.